United States Patent Office 2,731,803
Patented Jan. 24, 1956

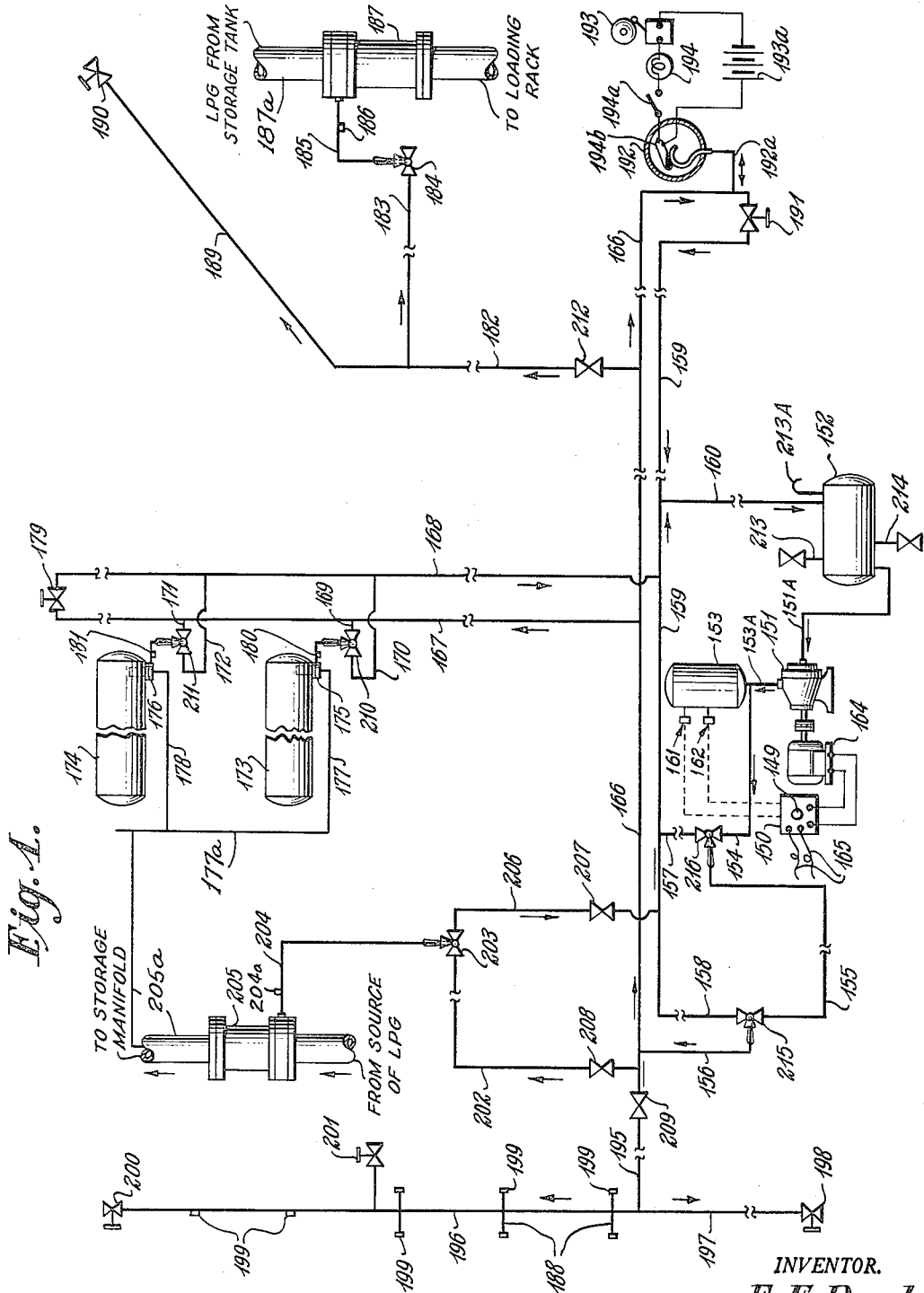

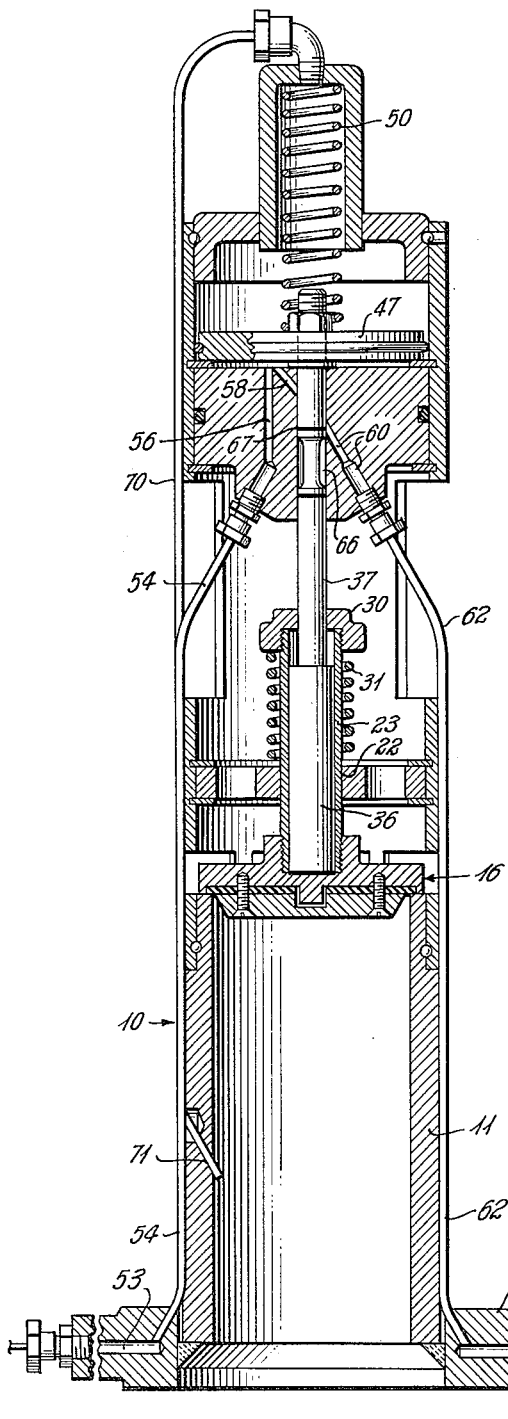
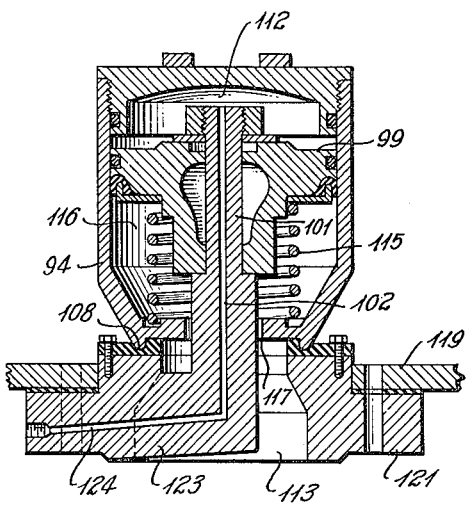
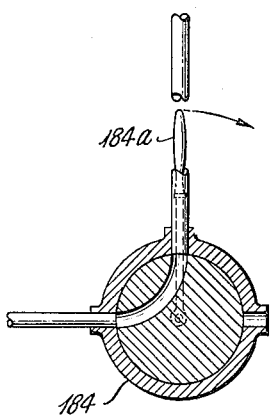
INVENTOR.
E. E. Reed
BY Hudson & Young
ATTORNEYS

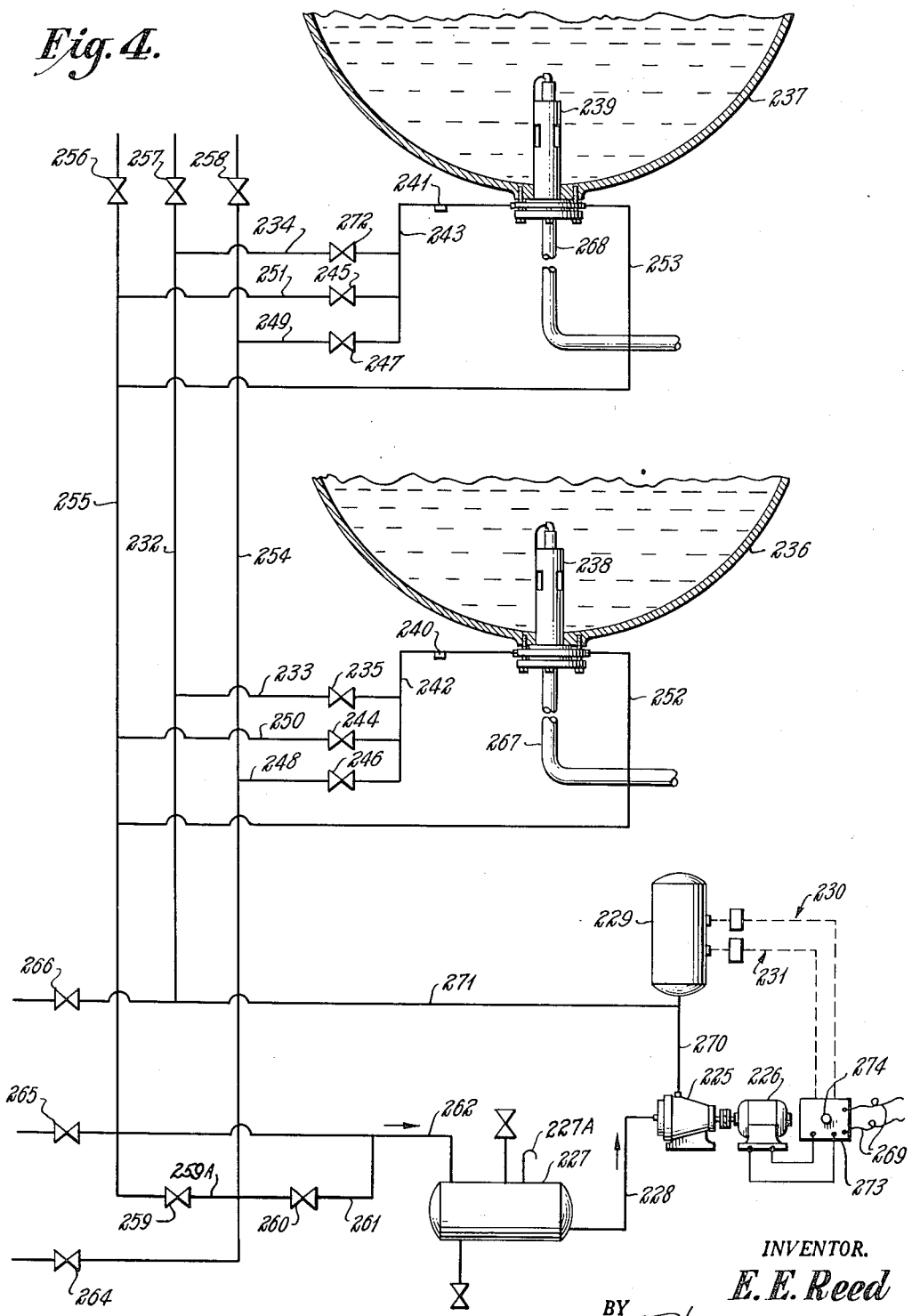

2,731,803

HYDRAULIC CONTROL SYSTEM FOR LIQUEFIED GAS FLOW CONTROL VALVES

Edwin E. Reed, Bartlesville, Okla., assignor to Phillips Petroleum Company, a corporation of Delaware Application April 13, 1953, Serial No. 348,343

14 Claims. (Cl. 62—1)

This invention relates to apparatus for controlling the flow of liquefied gases. In one aspect it relates to apparatus for use in storing and in dispensing liquefied gases. In another aspect it relates to apparatus for use in controlling the flow of liquefied gases from points adjacent apparatus containing the liquefied gases or from remote points, thereby enhancing the safety of handling such liquids.

My invention is concerned with a safety control system for use in combination with a storage tank containing a liquefied gas under superatmospheric pressure, providing for the emergency shut off of the liquefied gas flow to or from the tank in case of fire adjacent or at a point remote from the tank.

An object of my invention is to provide a system for dispensing liquefied gases under pressure.

Another object of my invention is to provide safe equipment for handling liquefied petroleum gases under pressure and which will comply with the "Standards of National Board of Fire Underwriters" and with local requirements at a given installation.

Another object of my invention is to provide in combination with a storage tank containing liquefied gases at superatmospheric pressure, a safe system for filling the storage tank and for dispensing liquid therefrom.

Still another object of my invention is to provide for the manual shut-off and for automatic shut-off of liquefied petroleum gas flow to or from a storage tank in the event of the occurrence of fire in close proximity to the flow system.

Still other objects and advantages will be apparent to those skilled in the art from the accompanying discussion and disclosure.

In accordance with my invention I provide a system in combination with a storage tank, for filling the tank and for dispensing liquid therefrom and automatically terminating liquid flow into or therefrom in the event of fire in close proximity to the tank and filling and dispensing system. I further provide manually operable apparatus for terminating fluid flow into or from the storage tank in the event of fire in close proximity to the tank and filling and dispensing system.

In a broad embodiment, the dispensing system of my invention comprises in combination with storage tank filling and dispensing lines, a pressure liquid in a separate line for operating a motor valve for controlling the flow of liquefied gas into or from the storage tank. The pressure on this liquid may be relieved by the use of fusible plugs in the pressure liquid line at points in close proximity to the tank and thereby close the tank valves. I provide for the manual relieving of the pressure liquid from the system at points safely remote from the storage tanks or flow pipes containing the liquefied gases. I also provide for a plurality of manually operable by-pass valves or bleed valves, at a plurality of points safely separated from one another and remote from the storage tanks and flow lines for relieving the liquid pressure. I also provide a visual and audible warning system for use in case an emergency arises and the tank valves are closed by relief of pressure liquid from the lines carrying the pressure liquid to any point of the system. I still further provide pressure responsive means for shutting down the pressure liquid pump in case the pressure is relieved to a pressure below a desired minimum pressure.

In a preferred embodiment of my invention a fluid pressure operated motor valve is positioned in a liquefied gas filling and dispensing pipe at a point in or adjacent the storage tank. At least one fusible plug and preferably a plurality, are disposed at selected points in the wall of the pressure fluid conduit for automatic relief of pressure. The pressure fluid conduit is extended to a point at a safely remote distance from the storage tank and a bleed valve is installed in the line so that in case of emergency an operator can manually relieve the fluid pressure and permit closing of all of the motor valves controlling the flow of liquefied gas in the entire system.

The bleed valves may be plug valves or any other type of valve suitable for retaining liquid under high pressure and which can be quickly opened.

The fusible plugs used have melting points not lower than about 80° C. and not exceeding about 200° to 300° C., although plugs having melting points outside this range may be used if desired. In case of fire in close proximity to the filling and dispensing system, the fusible plugs in the pressure liquid conduit become heated and melt providing relief in the wall of the pressure liquid conduit through which the liquid escapes thus immediately relieving the pressure and permitting the tank shut-off valves to close.

I prefer to locate the pressure fluid conduit containing a plurality of such fusible plugs in close proximity to the storage tanks and the liquefied gas filling and dispensing lines so that in case of fire at least one fusible plug will be melted to relieve the pressure liquid and permit closing of the tank valves.

In the drawing—

Figure 1 illustrates a preferred embodiment of the safety control system of my invention.

Figure 2 is a longitudinal sectional view of a flow control motor valve.

Figure 3 is a longitudinal view, partly in section, of another embodiment of a flow control motor valve.

Figure 4 illustrates diagrammatically another form of a flow control apparatus of my invention.

Figure 5 illustrates, partly in section, an apparatus part of Figure 1.

On reference to Figure 1, a plurality of liquefied gas storage tanks are identified by reference numerals 173 and 174. Pipes or conduits 177 and 178 are provided for these tanks, respectively, as illustrated for filling the tanks or dispensing liquid therefrom. Tank 173 is provided with a pressure liquid operated motor valve 175. Tank 174 is provided with a similar motor valve 176. These motor valves are pressure fluid operated motor valves containing a biasing element for biasing the valves to a normally closed position. These valves open under the influence of fluid pressure introduced into the motor of the valve and close upon relief of this fluid pressure under the influence of the biasing element. A pressure fluid supply line 167 supplies the pressure fluid for passage through a pipe 169, valve 210 to the motor of the motor valve 175. This pipe 169 is provided with at least one fusible plug 180 located at a point in close proximity to the tank. A pipe 170 is provided for receiving the pressure fluid when same is exhausted from the motor valve. Pipe 170 is attached to a main pressure liquid return line 168.

Pipe 171 provides pressure fluid from the main pressure liquid line 167 to motor of valve 176, and contains at least one fusible plug 181. A pressure liquid return line 172 is connected with a valve 211 for return of pressure liquid exhausted from valve 176 to the main pressure liquid return line.

The valves 210 and 211 can be three-way valves such as valve 184 illustrated in Figure 5. These three-way valves 184 are provided with handles as handle 184a for the manual operation of the valves. The three-way valves 210 and 211 are also provided with similar handles for their manual operation.

The pressure liquid pipe 167, as illustrated, is extended to a point remote from the tanks and at such a remote point is provided with a valve 179 for relieving the pressure therefrom to the low pressure liquid return line 168. Since the motor valves 175 and 176 are biased to a closed position on relief of pressure from their liquid operated motors, upon relief of pressure liquid from pipe 167 through valve 179 the several motor valves are quickly closed.

For supplying the hydraulic liquid under pressure for operating the motor valves of this system I provide a pressure liquid storage tank 152 containing a filling pipe 213 and a drain pipe 214. Liquid from this tank is drawn into a rotary pressure pump 151 via line 151A and is pumped under pressure via pipe 153A into a pressure control tank 153. Liquid under pressure flows from this pipe 153A through pipe 154, three-way valve 216, pipe 155, three-way valve 215 and pipe 156 into a pressure liquid header line 166. From this pressure liquid header line, pressure liquid take-off lines 167, 182, 202, 196 and 197 are provided. These pressure liquid take-off lines conduct the pressure liquid to various liquefied gas flow control points as desired. For example, liquid take-off line 202 conducts this pressure liquid to a three-way valve 203 and line 204 to a motor valve apparatus 205 for controlling the flow of liquefied gas therethrough. As an illustration of the control of liquefied gas at such a point the liquefied gas, from a source not shown, flows through valve 205 and pipe 205a to a storage manifold 177a. This manifold is provided with side outlets which in turn are connected, for example, to pipes 177 and 178 for filling storage tanks. Pipe 206 is for return of pressure liquid from the motor of the valve 205 upon operation of three-way valve 203 to close this motor valve. Pipe 204 contains at least one fusible plug 204a. Valves 207 and 208 are provided to close off pressure liquid in case repairs need to be made to apparatus parts 203, 204a, 205, or pipes 202 or 206, or in case said apparatus parts are not used.

The remote end of the pressure liquid take-off line 167 is connected to the pressure liquid return line 168 by the valve 179 so that relief of pressure in line 167 by valve 179 will not waste the pressure liquid and it may be returned to storage for reuse.

Tank 152 is provided with a vent 213A.

The pressure liquid take-off line 182 containing a valve 212 is connected with pipes 183 and 189. Pipe 183 leads to the three-way valve 184 which controls pressure liquid by way of line 185 to and from a motor valve 187. This pressure pipe 185 contains at least one fusible plug 186 positioned in close proximity to the motor valve 187 so that in case of fire, pressure in line 185 will be relieved. The motor valve 187 can control the flow of liquefied gas from the hereinabove referred to storage tank manifold to, for example, a loading rack, not shown. Such a loading rack may be a tank car loading rack or a truck loading rack or a combination of both.

Pipe 189 is extended from the end of pipe 182 to a point remote from the motor valve 187 and it contains a bleed valve 190. This bleed valve 190 is positioned at such a remote point that it may be manually opened without danger to an operator in case of fire in the vicinity of the motor valve 187 or at any other point in the system. At the opposite end of the main pressure liquid pipe 166 is disposed a valve 209 which when opened permits flow of pressure liquid through a pipe 195 to the take-off pipes 196 and 197. These take-off pipes 196 and 197 can, if desired, lead to other liquefied gas storage tanks, loading racks or any other liquefied gas handling equipment as desired, and not shown. Disposed in pipe 196 are a plurality of fusible plugs 199. These plugs 199 may be disposed in the walls of pipe 196 or they may be disposed in extensions, as for example extensions 188. Pipe 197 can be extended to a remote point and provided with a bleed valve 198 for relieving the pressure liquid in the event of fire to close all of the motor valves. The valve 209 is provided to close off liquid pressure from pipe 195, in case this portion of the system is not used. Valve 212 is provided in case it is ever necessary to repair apparatus downstream of valve 212.

The pressure liquid surge tank 153 is equipped with pressure switches 161 and 162. The pressure switch 162 can be of any suitable type attainable in commerce and adapted to close off electric motor 164 driving the pressure liquid pump 151 when the pressure in the pressure tank exceeds for example 600 pounds per square inch and turns on the motor when the pressure in the tank reaches a minimum pressure of for example 500 pounds per square inch. The electrical switch apparatus may be housed in a relay box 150. The pressure switch apparatus 162 is intended to shut off the electric motor 164 at any time the pressure in the tank 153 reaches a predetermined minimum pressure for example 400 pounds per square inch. Under normal operating conditions the pressure switch 161 will control the pressure in tank 153 to pressures between 500 and 600 pounds but upon opening of any one or more of the bleed or by-pass valves or melting of one or more of the fusible plugs and the pressure in the tank drops to below, for example, 400 pounds per square inch the electric motor 164 will be stopped. This latter condition would arise during an emergency and under emergency conditions obviously it would be desirable to stop the pressure pump so as not to inadvertently open any of the liquefied gas flow control motor valves. Electric current from a source, not shown, is conducted to the system of Figure 1 by wires 165. When the system is in a shut-down condition a push button apparatus 149 is provided to by-pass the pressure control apparatus 162 to start the motor 164. This button 149 is pushed until the pressure in the tank 153 reaches a pressure above the above-mentioned 400 pounds per square inch.

A pipe 160 is provided as a main pressure liquid return line through which flows all of the pressure liquid from the several branch return lines into the tank 152.

Three-way valves 215 and 216 are also provided as overall safety valves for closing down the entire plant. These two valves may be positioned at strategic positions easily accessible to an operator. These three-way valves can be exactly like the three-way valve 184 and upon turning the handle of valve 215 in the direction of pipe 158 the source of pressure liquid will be closed off and the pressure liquid in pipe 156 will be relieved through the valve to the return line 158 and the motor valves of the system will be biased closed. In like manner when an emergency arises and an operator is in the vicinity of the three-way valve 216, upon turning the handle of this valve in the direction of line 157 the pressure liquid from line 154 will be closed off and the pressure liquid from line 155 will be relieved to the return line 157 and the motor valves will be closed.

An alarm apparatus can be provided if desired for notifying an operator of the occurrence of an emergency. For example, I provide a light 194 which turns on in case the pressure of the pressure liquid in high pressure line 166 drops below for example 400 pounds per square inch. Such a warning system includes a pressure responsive relay apparatus such as a pressure switch 192. This pressure switch 192 can be attached to pressure line 166 by a pipe 192a. This pressure switch 192 can be of a Bourdon tube mercury switch type in which contraction of the Bourdon tube due to a decrease in pressure within the tube closes a mercury switch 194b to the electric light 194. This electric light can be supplied electricity from a battery 193a or other source as desired. As a further warning to an operator a bell 193 may be employed in the circuit. The electric light 194 may if desired be a colored light for example, red, so that it will be especially noticeable. The bell 193 may if desired be replaced by an electric horn. The main point of this sound warning element is that sufficient sound will be made to attract the attention of an operator in case of emergency. In case it is desired not to use the signal system for any reason whatever, a switch 194a is provided.

Provided in the side extension of pressure liquid pipe 196 is a bleed valve 201 which may be similar to bleed valves 190, 198 and 200. The manually operable by-pass valve 191 connecting pipes 166 and 159 may be similar to the by-pass valve 179.

The motor valve illustrated in Figure 2 of the drawing can be used as the motor valves 175, 176, 187 and 205 of Figure 1. When used as valves 175 and 176 the valve of Figure 2 may be inserted into the tanks while where used as valves 187 and 205 a casing or housing to enclose the valve should be supplied. This valve is fully described in a copending application Serial No. 263,255, filed December 26, 1951. This valve includes a flange portion 121 which is attached to a tank flange or pipe flange 119. Coextensive with the flange 121 is a member 123 which extends through the center of the valve conduit. From this central member a piston rod element 101 extends at right angles to the plane of the flange into the tank or housing. A piston 99 is attached to this piston rod. A movable cylinder 94 surrounds the piston and the lower end of the cylinder is tapered and terminates as valve seat 108. This end of the cylinder is closed excepting for a small annular opening 117 surrounding piston rod 101. A compression spring 115 biases the valve in a normally closed position. To open this valve it is merely necessary to introduce pressure fluid through opening 124 and through opening 102 into the space 112 above the piston. Upon exertion of fluid pressure in this space the cylinder 94 and valve seat moves upward to open the valve to the flow of fluid through the inlet and outlet space 113. Upon relief of the pressure from space 112 through the openings 102 and 124 the spring 115 biases the valve to a closed position. This valve is so constructed that the valve seat 108 is of a smaller diameter than the inside diameter of cylinder 94 so that downstream pressure will be exerted in the space 116 in such a manner as to assist in holding the valve closed once the valve is closed by the compression spring. This valve may be termed an "anti-back flow valve" since the greater the downstream pressure the tighter the valve seat is closed against its resilient seal. When it is desired to open the valve it is merely necessary to introduce pressure fluid through conduits 124 and 102 into the space between the piston and the cylinder head and raise the cylinder and the valve seat from its closed position. As long as sufficient pressure is retained in space 112 the valve will remain open and liquid may flow through the valve in either direction.

This type of valve is especially adapted for use in such liquefied gas storage and dispensing systems as disclosed herein.

On reference to Figure 4 of the drawing a second embodiment of a liquefied gas storage system is illustrated. In this system is a rotary pressure liquid pump 225 driven by a motor 226. This pump and motor and many of the parts illustrated in Figure 4 are similar to the corresponding parts of Figure 1. All of the parts of the oil pressuring system are similar to the corresponding parts of Figure 1. Pipe 270 connects pump 225 with the pressure surge tank 229. Pressure switches 230 and 231 are intended to control the pressure of the pressure liquid in tank 229 at a pressure between 500 and 600 pounds per square inch and to close down the pump in case the pressure in this tank drops to a value below 400 pounds per square inch. These pressure switches function in conjunction with a relay apparatus 273 to control the electric motor 226. Electricity from a source, not shown, is conducted to this relay by wires 269. A push button 274 allows starting up of the apparatus from zero pressure. Tank 227 is a pressure fluid tank. Pipe 228 conducts pressure fluid from this tank to pump 225. Tank 227 is provided with a vent 227A to the atmosphere.

A pressure liquid pipe 271 is connected with pipe 270 and to a pressure take-off pipe 232 as shown. From this pressure take-off pipe 232 several pipes 233 and 234 are connected. These latter pipes contain respectively valves 235 and 272. A manifold system 243 connects valve 272 with a motor valve 239 positioned in a tank 237. Valve 235 is connected by way of manifold 242 to a second motor valve 238 in tank 236. Manifold pipes 242 and 243 contain at least one fusible plug each, 240 and 241. Pressure liquid from pressure liquid pipe 232 flows through take-off pipes 233 and 234 through the respective valves and manifolds to open the motor valves 238 and 239. The manifolds 242 and 243 are connected with side lines 250 and 251 respectively by way of valves 244 and 245 respectively. These latter two pipes are connected in turn to a pressure liquid return line 255. The manifolds 242 and 243 are also connected to an emergency liquid line 254 by way of pipes 248, 249, respectively, carrying check valves 246, 247 respectively. Check valve 247 is intended to pass liquid only from the manifold 243 to pipe 249. In like manner the check valve 246 is intended to permit the flow of pressure liquid from manifold 242 to pipe 248 and not in the reverse direction. The lower end of the pressure liquid return line 255 is connected with a pressure liquid return line 262 for return of liquid to the run tank 227. The emergency pressure liquid line 254 is connected to return line 262 by pipe 261 carrying a valve 260 and by pipe 259A carrying a valve 259. Pipes 259A and 261 may lead to remote and relatively safe locations so that an operator may open either valve 259 or valve 260 and relieve pressure liquid from the emergency line 254 into the pressure liquid return line 262 thereby closing the motor valves. Since pipes 248 and 249 are provided with check valves as disclosed above, this emergency line will contain pressure liquid under pressure liquid operating pressure at all times the motor valves are open. Thus valves 259 and 260 must be closed at all times excepting such times as it is desired to close the motor valves.

Pipes 255 and 262 are not shown to contain flow control valves since these pipes are merely pressure liquid return pipes.

When this system is in operation and for example motor valve 239 is open, by opening valve 245 in pipe 251 pressure liquid from the motor valve will be vented therethrough and the motor valve 239 will close. In like manner when it is desired to close motor valve 238 it is merely necessary to open valve 244 in pipe 250. Obviously the pressure liquid inlet valves 235 and 272 should be closed at the time of opening of valves 244 and 245, respectively.

When motor valves 238 and 239 are held in an open position this particular type of valve bleeds off a small quantity of pressure liquid and return pipes 252 and 253 are provided for conducting the bleed off liquid therefrom to the pressure liquid return line 255. Tanks 236 and 237 are provided with liquefied gas inlet and outlet pipes 267 and 268, respectively.

In case it is desired to utilize this pressure liquid valve control system for operating additional storage or dispensing tanks, truck or tank car loading racks the three pipes 255, 232, and 254 may be extended from valves 256, 257, and 258, respectively. In like manner these three main pressure liquid lines were also illustrated as extending in a different direction beyond valves 266, 265, and 264 for such other use as desired.

The motor valves 238 and 239 as illustrated diagrammatically in Figure 4 are illustrated in detail in Figure 3. Such a valve is described in detail in a copending application Serial No. 287,368, filed May 12, 1952, now Patent No. 2,707,484. This valve structure combines a number of safety features in a single unitary valve structure which is adapted for control by hydraulic fluid. This valve can be rapidly and positively closed by proper regulation of the hydraulic fluid supply and, in the open position, the structure has the additional function of performing as an excess flow valve, that is, a normally open valve which is closed when the rate of fluid flowing therethrough exceeds some predetermined rate. As an additional feature the valve also incorporates a mechanism whereby, with the valve in a closed position, there is a positive sealing action should the fluid pressure downstream of the tank become greater than the fluid pressure inside the tank to which the valve is attached. Referring now to Figure 3 this valve is enclosed in a casing 10. One end 11 of casing 10 is provided with a flange 13 for attaching the valve to a tank flange. This valve contains a valve 16 for controlling the flow of liquid to or out of the tank. To open this valve pressure liquid from a source, not shown, is introduced into the valve through conduits 53 and 54. From conduit 54 the pressure liquid passes through a bore or conduit 56 into a space under a piston 47 whence this piston raises. A piston rod 37 and attached plunger 36 rise upward with the piston. When the plunger 36 rises and contacts a shoulder of element 30, this element is raised upwardly with the plunger. Element or cap 30 is attached by way of a sleeve 23 to valve 16 so that when cap 30 is raised valve 16 is opened. A compression spring 31 surrounds sleeve 23 and is intended to bias valve 16 in an open position. When the piston 47 is in its fully upward position pressure liquid under the piston bleeds through a bore 58 through space 66, through bore 60 and out of the valve through tube 62 and conduit 63. Thus at all times when this valve is fully open and the piston 47 is at the upward end of its stroke there is bled through bore 58 a small but continuous stream of pressure liquid.

When it is desired to operate this valve as an excess flow valve the source of pressure liquid entering the valve is closed off. On reference to Figure 4, relative to tank 237 and valve 239 when it is desired to operate such a valve as an excess flow valve, manually close valve 272 in line 234. Under this condition pressure liquid continues to bleed through bore 58 and tube 62 and piston 47 is forced downward under the influence of a strong compression spring 50. This compression spring 50 is intended to be a stronger spring than the above-mentioned spring 31. When piston 47 is depressed the space 66 travels downward also. At the upper end of space 66 is provided an O-ring seal 67 which seals lower parts against entry of pressure liquid from bore 58. This O-ring seal also assists in sealing bleed tube 60 against entry of pressure liquid from bore 58. Thus in this location of space 66, pressure liquid cannot be removed from the space under the piston 47 through bores 58 and 60. When the space 66 is in this position the plunger 36 is intended to rest against the valve 16 but the bias of compression spring 31 actually holds the valve in an open position. In this position the valve operates as an excess flow valve in that it remains open so long as the rate of passage of the stored liquid downward through the valve is below such a rate as will compress spring 31 to close the valve.

When the valve is in a fully open position or in a position acting as an excess flow valve, if it is desired to close the valve quickly it is merely necessary to open a valve such as valve 244 or 245 of Figure 4 and bleed off the pressure liquid to the pressure liquid return line.

When this valve is in a fully closed position in one tank and some other tank on the same manifold is to be filled with a high pressure liquid and this liquid backs up through the manifold into the valve casing end 11 (Figure 3) against the underside of the valve 16 this valve cannot open because this high pressure liquid passes through conduits 70 and 71 to a space on the top side of piston 47. Since the diameter of piston 47 is greater than the diameter of valve 16 the total force biasing the valve in a closed position is greater than the total force tending to open the valve.

While I have described pumps 151 and 225 as being rotary pumps, which type of pump is preferable, other suitable types of pump may be employed such as a piston pump, centrifugal pump, gear pump or the like. Centrifugal pumps are least satisfactory because of the high pressures necessary. Piston pumps are not ordinarily preferable in such installations unless the pressure surge tanks are relatively large or the piston displacement relatively small, or both.

While I have disclosed mainly a single fusible plug in the pressure liquid line adjacent the tanks it is to be understood that as many fusible plugs as desired may be used. When using a plurality of plugs it is desirable to position them at strategic points relative to the proximity of the liquefied gas being stored so that in case of fire at least one plug will be present to melt and permit the motor valves to close.

In like manner as many three-way valves as valves 215 and 216 of Figure 1 and by-pass lines 158 and 157 may be utilized at as many locations as possible in order to promote safety. Such valves should be located at various and sundry strategic positions so that at least one valve will be reasonably close to an operator at all times when the operator is on duty. In like manner as many by-pass valves 179 and 191 may be provided as desired. Similarly as many bleed valves as valves 190, 198, 200, 201 may be provided at various locations as desired.

While I have described the operation of the storage and dispensing apparatus of Figures 1 and 4 as applied to storing and dispensing a liquefied gas under superatmospheric pressure it is to be understood that my invention broadly provides for storing and dispensing fluids of any type under pressure, such as normally gaseous hydrocarbon, sulfur dioxide, carbon dioxide, ammonia or the like, either in the gaseous or liquid state.

A pressure liquid suitable for use in the pressure fluid or liquid system can be a 10W or a 5W or other oil having suitable pour point and viscosity characteristics. The pour points of such oils should be sufficiently low as not to set up and clog the hydraulic high pressure and return pipes in cold weather. Similarly the oils should have sufficiently low viscosity, i. e., they should be sufficiently fluid as to flow relatively easily in the high pressure and low pressure pipes so that when a valve is opened or a fusible plug melts at one location pressure in the high pressure pipes will drop quickly at other locations to close all motor valves. Increasing the diameter of the high pressure and return oil pipes tends to offset disadvantageously high viscosity. The oils should also be sufficiently free from such waxy matter as that which precipitates as individual crystals at constricted points in the oil containing pipes. This latter type of crystal formation occurs at temperatures above the accepted pour point temperatures and frequently occurs in valves, orifices, and in constrictions and may cause plugging at such points. It is preferable that the oil used have at least some lubricating properties to lubricate the hydraulic valves herein contemplated.

The oil pressure tanks, 153 of Figure 1 and 229 of Figure 4 should preferably be conventional diaphragm tanks. Such tanks are available in commerce and contain diaphragms of synthetic elastomers which are resistant to hydrocarbons. In these tanks provision is usually made for the hydrocarbon to be retained between the diaphragm and one end while nitrogen gas under pressure is on the other side of the diaphragm. A safety element is provided in the tank so that upon reduction of pressure, to atmospheric, for example, the diaphragm will not rupture nor be forced through the hydrocarbon inlet opening.

As will be evident to those skilled in the art various modifications of this invention can be made or followed in the light of the foregoing disclosure and discussion, without departing from the spirit or scope of the disclosure or from the scope of the claims.

I claim:

1. A liquefied gas storage and dispensing system comprising, in combination, a plurality of tanks, a separate liquid inlet and outlet line in communication with each tank, a motor valve in each line controlling the flow of liquefied gas to and from each respective tank, a pressure liquid conduit, means to supply pressure liquid in said conduit, the motor of each motor valve biasing its valve in a normally closed position, a separate conduit connecting the motor of each motor valve to said pressure liquid conduit, a separate valve in each of the separate conduits for selectively transmitting pressure liquid from said pressure liquid to the respective motors to open said motor valves and for selectively relieving pressure liquid from said respective motors to close said motor valves, a valve means in communication with said pressure liquid conduit for relieving all tank valve motors of said pressure liquid simultaneously, said means to supply pressure liquid in said conduit comprises a pump adapted to impart pressure to liquid being pumped, a pressure liquid surge tank in communication with the discharge of said pump, said pressure liquid conduit communicating with said pressure liquid surge tank, a first pressure response control means communicating with said pressure liquid surge tank and being adapted to maintain the pressure within said surge tank between predetermined upper and lower limits, and a second pressure responsive control means communicating with said pressure liquid surge tank and being adapted to shut off said pump when the pressure of the liquid in said surge tank decreases to a predetermined pressure below the aforementioned lower limit to bias said motor valve closed.

2. A liquefied gas storage and dispensing system comprising, in combination, a plurality of tanks, a separate liquid inlet and outlet line in communication with each tank, a motor valve in each line controlling the flow of liquefied gas to and from each respective tank, a pressure liquid conduit, means to supply pressure liquid in said conduit, the motor of each motor valve biasing its valve in a normally closed position, a separate conduit connecting the motor of each motor valve to said pressure liquid conduit, a separate 3-way valve in each of the separate conduits for selectively transmitting pressure liquid from said pressure liquid conduit to the respective motors to open said motor valves and for selectively relieving pressure liquid from said respective motors to close said motor valves, a pressure liquid return line for returning pressure liquid to the suction side of said means to supply pressure liquid in said pressure liquid conduit, a separate pressure liquid return pipe connecting each of said separate manually operable valves and said pressure liquid return line, a valve means communicating with said pressure liquid conduit for relieving pressure liquid therefrom, this latter valve means being disposed at a point remote from said plurality of tanks and said latter valve means also being in communication with said pressure liquid return pipe.

3. The system of claim 2 wherein at least one plug fusible at a temperature within the limits of 80° to 300° C. is disposed in the wall of each pipe connecting the motor of each motor valve and said pressure liquid conduit.

4. The system of claim 3 wherein each plug is disposed in the wall of each pipe intermediate the valve motor and the 3-way valve.

5. A liquefied gas dispensing system comprising, in combination, a tank, an elongated liquid dispensing conduit communicating at one end with said tank, a pressure liquid conduit, a pump means to establish pressure in said pressure liquid conduit, a first motor valve in said liquid dispensing conduit controlling flow of liquid therethrough comprising a first valve, a first motor operating said valve and means biasing said valve normally closed, a pipe connecting said pressure liquid conduit and the motor of said valve to supply pressure liquid to said motor to open said valve against said bias, a valve means in said pipe connecting said pressure liquid conduit and the valve motor for transmitting pressure liquid to said motor and for relieving pressure liquid therefrom to bias said valve closed, a pressure liquid return line for returning pressure liquid to the suction side of said means to supply pressure liquid in said pressure liquid conduit, a pressure liquid return pipe connecting said valve means and said liquid return line, a normally closed second motor valve in said dispensing conduit near the other end thereof to control the flow of liquefied gas therethrough comprising a second valve, a second motor operating said second valve and a second means biasing said second valve closed, a second pipe connecting said pressure liquid conduit and said second motor to supply pressure liquid thereto to open said second valve against its bias, a valve means in said second pipe for controlling pressure to said second motor valve and for relieving pressure liquid therefrom to bias said second motor valve closed, a manually operable valve means communicating said pressure liquid conduit with said pressure liquid return line for relieving pressure liquid from said pressure liquid conduit to said return line to bias said motor valves closed, the latter manually operable valve means being disposed at a point remote from said first and second motor valves.

6. In the dispensing system of claim 5 wherein a manually operable pressure liquid bleed valve is supplied in communication with said pressure liquid conduit at a point remote from said tank for bleeding pressure liquid from said conduit to bias said motor valves closed.

7. In the dispensing system of claim 5 wherein at least one plug fusible at a temperature within the limits of 80° to 300° C. is disposed in the wall of said pipe connecting said first motor valve and said pressure liquid conduit and intermediate said motor valve and said valve means and at least one plug fusible at a temperature within the limits of 80° to 300° C. is disposed in the wall of said second pipe and intermediate the valve means in said second pipe and said second motor.

8. In the dispensing system of claim 5, a pressure responsive means in communication with said pressure liquid conduit and a visual and an audible means communicating with said pressure responsive means in such a manner as to light a light and produce a sound when the pressure of the liquid in said pressure conduit decreases below a predetermined pressure.

9. In the system of claim 5 wherein at least one manually operable 3-way valve is disposed in a bypass pipe connecting said pressure liquid conduit and said return line at a point intermediate said means to establish liquid pressure in said pressure liquid conduit and said tank in such a manner that upon operation of this latter 3-way valve, the pressure liquid from said pressure liquid conduit may flow directly to said pressure liquid return line.

10. In the system of claim 5, at least one plug fusible at a temperature within the limits of 80° to 300° C. is disposed in the wall of said pressure liquid conduit and at such a location as to be in close proximity to a body of liquefied gas.

11. A liquefied gas dispensing system comprising in combination, a tank, a liquid inlet and outlet line in communication with said tank, a motor valve in said liquid inlet and outlet line, a pressure liquid conduit, means to supply pressure liquid in said conduit, said motor valve comprising a valve in said liquid inlet and outlet line to control flow of liquid therethrough, a pressure liquid operated motor for controlling said valve and a means biasing said valve to a normally closed position, a pressure liquid return line for returning pressure liquid to said means to supply pressure liquid in said conduit, a pressure liquid emergency return line, a manifold connecting the pressure liquid conduit, the pressure liquid return line and the pressure liquid emergency line to the motor of said motor valve, a manually operable valve in each the pressure liquid conduit and the pressure liquid return line controlling the flow of pressure liquid to and from said manifold, a check valve in said emergency line permitting flow of pressure liquid only from said manifold to said emergency line, a conduit connecting a pressure liquid outlet of the motor valve with said pressure liquid return line, said motor of said motor valve being adapted to close partially its valve upon closing off the supply of pressure liquid to the said motor and thereupon said valve acting as a check valve in said liquid inlet and outlet line, and upon opening the valve in the return line branch of said manifold the bias of said valve closes same, a separate manually operable bleed valve in said pressure liquid conduit and in said emergency line on the side of the manifold opposite said means to supply pressure liquid, at least one manually operable valve connecting said pressure liquid return line and said pressure liquid emergency line to relieve the pressure liquid from said motor to close said motor valve under the influence of said bias.

12. In the system of claim 11, at least one plug fusible at a temperature within the limits of 80° and 300° C. is disposed in the wall of the manifold adjacent said tank.

13. In the system of claim 12, wherein said means to supply pressure liquid in said pressure liquid conduit comprises, in combination, a pump adapted to impart pressure to the liquid being pumped, a pressure liquid surge tank in communication with the discharge of said pump, said pressure liquid conduit communicating with said pressure liquid surge tank, a first pressure responsive control means communicating with said pressure liquid surge tank and being adapted to maintain the pressure within said surge tank between predetermined upper and lower limits, and a second pressure responsive control means communicating with said pressure liquid surge tank and being adapted to shut off said pump when the pressure of the liquid in said surge tank decreases to a predetermined pressure below the aforementioned lower limit to bias said motor valve closed.

14. In the system of claim 11, at least one fusible plug is disposed in the wall of the manifold adjacent said tank.

References Cited in the file of this patent
UNITED STATES PATENTS

| | | |
|---|---|---|
| 1,829,020 | Shield | Oct. 27, 1931 |
| 1,935,333 | Replogle | Nov. 14, 1933 |